US008990436B2

(12) United States Patent
Mangano et al.

(10) Patent No.: US 8,990,436 B2
(45) Date of Patent: Mar. 24, 2015

(54) METHOD FOR HANDLING ACCESS TRANSACTIONS AND RELATED SYSTEM

(71) Applicant: STMicroelectronics S.r.l., Agrate Brianza (IT)

(72) Inventors: Daniele Mangano, San Gregorio di Catania (IT); Salvatore Pisasale, Catania (IT); Mirko Dondini, Catania (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 0 days.

(21) Appl. No.: 13/904,379

(22) Filed: May 29, 2013

(65) Prior Publication Data
US 2013/0326522 A1   Dec. 5, 2013

(30) Foreign Application Priority Data

May 30, 2012   (IT) .............................. TO2012A0470

(51) Int. Cl.
*G06F 3/00* (2006.01)
*G06F 9/46* (2006.01)
*G06F 13/16* (2006.01)

(52) U.S. Cl.
CPC ............ *G06F 9/466* (2013.01); *G06F 13/1626* (2013.01); *G06F 2213/0038* (2013.01)
USPC ................................................ 710/3; 710/34

(58) Field of Classification Search
USPC .............................. 710/3, 4, 33, 34
See application file for complete search history.

(56) References Cited

U.S. PATENT DOCUMENTS

| 6,108,345 | A  |   | 8/2000 | Zhang |
|-----------|-----|---|--------|-------|
| 6,292,807 | B1 |   | 9/2001 | Larson |
| 6,526,484 | B1 | * | 2/2003 | Stacovsky et al. ............ 711/158 |
| 6,571,332 | B1 |   | 5/2003 | Miranda et al. |
| 6,694,390 | B1 |   | 2/2004 | Bogin et al. |
| 6,950,886 | B1 |   | 9/2005 | Bailey |
| 7,047,374 | B2 |   | 5/2006 | Sah et al. |

(Continued)

FOREIGN PATENT DOCUMENTS

| EP | 2444903 | | 4/2012 |
| WO | 0177843 | A1 | 10/2001 |
| WO | 2011095963 | | 8/2011 |

OTHER PUBLICATIONS

European Patent Office, Search Report for EP Application No. 10306057, Feb. 2, 2011, 5 pages.

(Continued)

*Primary Examiner* — Ernest Unelus
(74) *Attorney, Agent, or Firm* — Allen, Dyer, Doppelt, Milbrath & Gilchrist, P.A.

(57) ABSTRACT

In an embodiment, access transactions of at least one module of a system such as a System-on-Chip (SoC) to one of a plurality of target modules, such as memories, are managed by assigning transactions identifiers subjected to a consistency check. If an input identifier to the check has already been issued for the same given target module, to the related identifier/given target module pair the same input identifier is assigned as a consistent output identifier. If, on the contrary, said input identifier to the check has not been already issued or has already been issued for a target module different from the considered one, to the related identifier/given target module pair a new identifier, different from the input identifier, is assigned as a consistent output identifier.

26 Claims, 3 Drawing Sheets

(56) References Cited

U.S. PATENT DOCUMENTS

| | | |
|---|---|---|
| 7,882,292 B1 * | 2/2011 | Van Dyke et al. ............ 710/244 |
| 8,032,676 B2 | 10/2011 | Wingard et al. |
| 8,244,950 B2 | 8/2012 | Barth et al. |
| 8,316,194 B2 | 11/2012 | Adl-Tabatabai et al. |
| 8,520,675 B1 | 8/2013 | Frailong et al. |
| 2004/0019723 A1 | 1/2004 | Ostrovsky et al. |
| 2004/0068603 A1 | 4/2004 | Augsburg et al. |
| 2012/0036296 A1 | 2/2012 | Wingard et al. |
| 2012/0079148 A1 | 3/2012 | Urzi et al. |
| 2012/0079154 A1 | 3/2012 | Mangano et al. |
| 2012/0207020 A1 | 8/2012 | Li et al. |

OTHER PUBLICATIONS

European Patent Office, Search Report for EP Application No. 10306058, Feb. 3, 2011, 5 pages.

International Search Report for Italian Patent Application No. TO20120470, The Hague, Feb. 18, 2013, 2 pages.

* cited by examiner

METHOD FOR HANDLING ACCESS TRANSACTIONS AND RELATED SYSTEM

PRIORITY CLAIM

The instant application claims priority to Italian Patent Application No. TO2012A000470, filed May 30, 2012, which application is incorporated herein by reference in its entirety.

RELATED APPLICATION DATA

This application is related to the U.S. patent application Ser. No. 13/241,874 entitled A TRANSACTION REORDERING ARRANGEMENT, filed Sep. 23, 2011, and which is incorporated herein by reference in its entireties.

This application is related to the U.S. patent application Ser. No. 13/248,316 entitled REORDERING ARRANGEMENT, filed Sep. 29, 2011, and which is incorporated herein by reference in its entireties.

TECHNICAL FIELD

The present disclosure relates to methods for handling transactions in signal processing systems.

Various embodiments may refer to systems of the kind currently named System-on-Chip (SoC).

SUMMARY

In the implementation of signal processing systems, such as so-called System-on-Chip systems, or SoCs, it is common practice to embed processing cores, such as, for example, ARM cores, into the system.

Such processing cores (for example of the cortex-A9/15 kind) may provide protocols, such as the Advanced Microcontroller Bus Architecture (AMBA) protocol (for example Advanced eXtensible Interface (AXI)3/4), which may constrain the order according to which some functions may be executed, for example, memory-access transactions.

Systems based on operating systems such as, for example, Android, may embed into various implementations memory-management units (MMUs) or similar functions, which do not permit the control of the allocation of buffers in memory.

By resorting to advanced hardware techniques to balance memory loads among several memories (for example Dual Data Rate (DDR) memories), the situation can become more complex, because of the current trend of masking the hardware complexity towards the applications.

It has been noticed that this has led, for example, to the development of specific hardware supports, which, for example, may ensure directly the compliance with ordering constraints (such as imposed, for example, by protocols such as AMBA); in this way the hardware may operate while taking into account the physical addresses, with the possibility of ensuring consistency on the level of the memory required by processing cores such as ARM cores.

The block diagram in FIG. 1 shows by way of example an application arrangement of the presently considered kind. In the diagram of FIG. 1, a module 10 is shown (which may include, for example, a logic block of the kind currently denoted as an intellectual property (IP) core), which includes drivers 11, which allow interfacing with a set of software or firmware applications APPS.

In operation, core 10 (by way of example only it can be assumed it is a CPU) accesses one or several "target" modules including, for example, memory modules MEM1, MEM2, etc., which can be, for example, Dual Data Rate (DDR) memories.

In various implementations, the access by module 10 to modules MEM1, MEM2, etc., may be implemented through access transactions, performed with a mechanism of assignment of transaction identifiers via a network N. The latter can be, for example, a so-called ICN, an acronym for "interconnect", which is the term currently used to identify on-chip communication systems. An advanced form of on-chip communication systems which is currently available is normally identified as a Network-on-Chip (NoC) system.

To this end, in various implementations, module 10 may have an ID assign function 12, which operates, for example, according to an AMBA protocol and which can interface, in various implementations, with a memory management unit (MMU). In various implementations, the MMU may cooperate with network N via an address remapping (AR) module or unit. In various implementations, units MMU and AR may perform, respectively, functions which may be classified as a memory-abstraction function (depending on a buffer allocation driven by applications APPS) and a load-balancing function (towards memories DDR MEM1, MEM2, . . . ), these functions communicating with each other as regards the assignments of the physical-addresses range (Assign Physical Addresses Range).

Unit MMU interacts, on the virtual address level, with the identifier-assign function 12 of module 10, and on the physical address level with unit AR; the latter interacts with network N on the level of remapped addresses.

According to general criteria, which can be applied to any kind of target modules (i.e., not only to memory units, such as memory units MEM1, MEM2, presently considered by way of example), the operation of a system, e.g., SoC, as schematically represented in FIG. 1, may be subjected to ordering and consistency rules for the transactions.

For example, in various implementations, for transactions having the same identifier, an ordering of transactions are ensured, so that the responses may be provided in the same order as the requests. Transactions with different identifiers may not be subjected to particular ordering constraints (for example two memories MEM1 and MEM2 may be accessed in parallel, without infringing the protocol, which generally may not apply to transactions not having the same identifier). Various implementations may provide a memory-control function, which may ensure a consistency criterion, while ensuring that accesses with the same identifier are not reshuffled, as may be useful to do in order to improve memory efficiency.

It has been observed that a way to achieve the compliance with ordering or consistency rules of this kind may involve a filtering function on a hardware level. Such an implementation (commercially known as Cyclic Dependency Avoidance Schemes (CDAS)) is used in some technologies for ARM interconnect (known, for instance, as CoreLink NIC-301, CCI-400). These implementations are based on the use of a hardware function so as to avoid the appearance of disorder situations which are not compatible with the AXI protocol. For example, a rule adapted to be implemented provides, in the presence of a transaction with an identifier ID already assigned to another outstanding transaction, the blocking/holding of the new transaction, while waiting for the outstanding transaction to "return" —"come back" —(i.e., to be finished), so as to avoid triggering disorder situations.

It has been observed that such implementations may worsen the performances which depend on the wait time for the return of the outstanding transaction. This situation may be particularly disadvantageous in the case of multiple memories (for example multi-DDR) with a remapping mechanism of the addresses, in order to balance the load on memory.

It has been moreover observed that these implementations are not generally applicable to SoC systems of the latest kind, which embed ARM processing cores. This is particularly true if one considers the fact that the techniques used for memory virtualization (MMU), and especially for address remapping, with the goal of balancing the load over multiple physical memories, may affect, even considerably, performances.

FIG. 2 shows, referring directly to the diagram in FIG. 1 (parts or elements identical or equivalent to those already described with reference to FIG. 1 are therefore not described again), an overall arrangement of the kind described in European Patent EP 2 444 903 A1, which is incorporated by reference.

The implementation in FIG. 2 may provide the presence of a transaction-reordering unit 20, such as to divide the communication chain between module 10 (for example a CPU) and the target modules (for example memories MEM1 and MEM2) into two sections:
- an "ordered" section, included between module 10 and transaction-reordering unit 20, and
- a "disordered" section, included between transaction-reordering module 20 and target modules MEM1, MEM2.

In such an implementation it may be possible to assign different identifiers to transactions that originally (i.e., upstream of unit 20) have the same ID.

It has been observed that:
- with such an implementation, the control function of target modules MEM1, MEM2 etc. (on the level of network N) is not adapted to ensure the consistency in handling access transactions to target modules;
- in the case of complex systems, adapted to support a very high number of simultaneously outstanding transactions or a correspondingly high number of modules, at least in some instances there may appear a saturation problem of identifiers ID.

Therefore, various embodiments described herein overcome one or more of the previously outlined drawbacks. Such embodiments include one or more methods and one or more related systems, for example, on a SoC (System-on-Chip) level.

Various embodiments may be based on a reordering arrangement which is compatible with the memory-consistency approach requested by protocols such as the AXI protocol.

Various embodiments may provide a specific sequence of steps which take into account both the target module being accessed and the system conditions.

Various embodiments may ensure high consistency and performance even in the case of SoC systems having system embedded ARM cores.

Various embodiments allow the use of advanced memory-management methods in multiple-memory systems (for example multi-DDR systems) without affecting performances or while complying with strict system constraints.

Various embodiments may implement a bit-compression system on transaction identifiers, so as to avoid saturation phenomena of identifier maps.

BRIEF DESCRIPTION OF DRAWINGS

One or more embodiments will now be described, by way of non-limiting example only, with reference to the enclosed views, wherein.

DETAILED DESCRIPTION

In the following description, numerous specific details are given to provide a thorough understanding of one or more embodiments. The one or more embodiments may be practiced without one or several specific details, or with other methods, components, materials, etc. In other instances, well-known structures, materials, or operations are not shown or described in detail to avoid obscuring aspects of the one or more embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the one or more embodiments.

Figure 1:
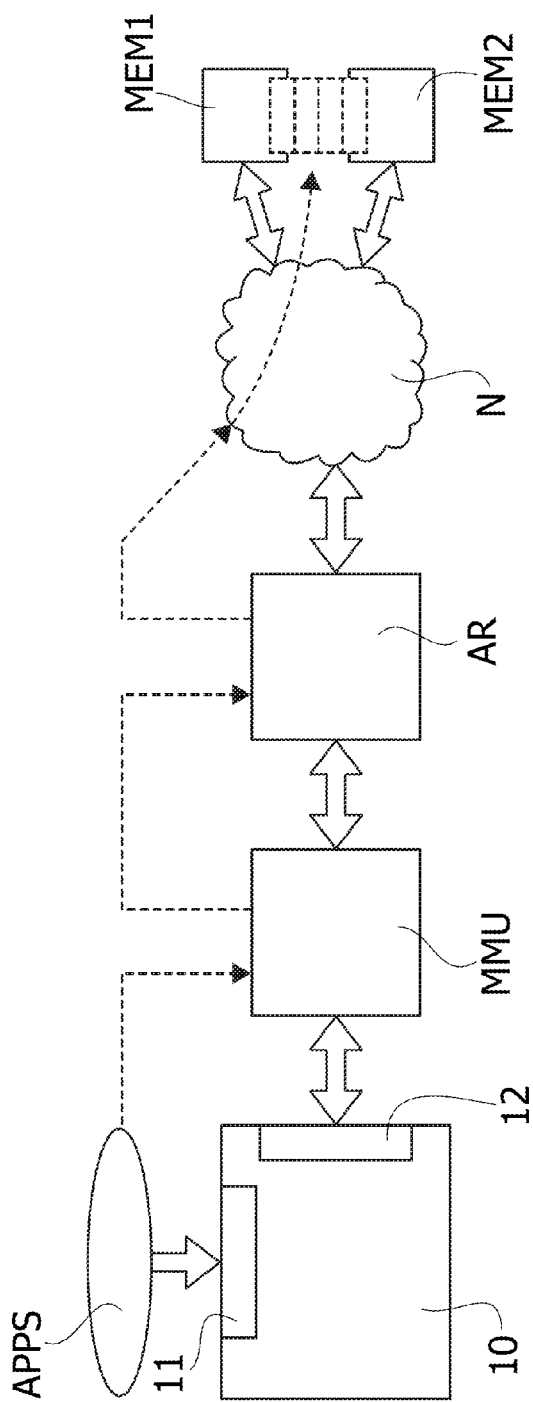
FIGS. 1 and 2 have already been described in the foregoing.

As for the overall architecture, various embodiments as exemplified in FIG. 3 may be based on the general arrangement previously described with reference to FIGS. 1 and 2. The previous description of the latter figures is, therefore, to be understood as applying to the embodiments described with reference to FIGS. 3 to 7, if not explicitly stated differently.

Figure 2:
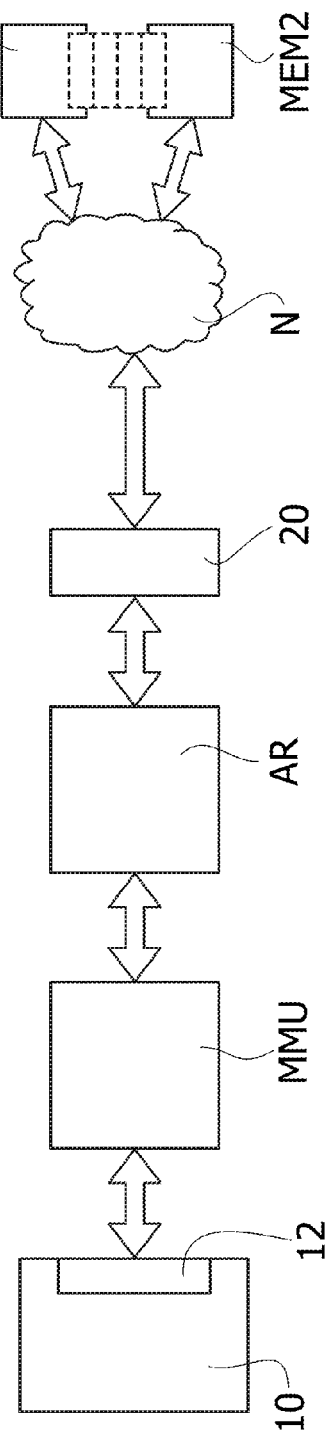
Figure 3:
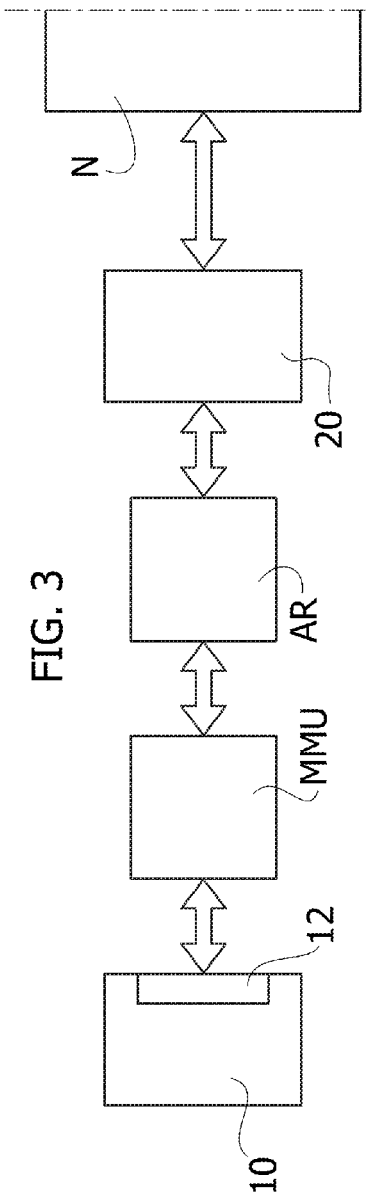
FIG. 3 is a general block diagram, according to one or more embodiments.

In the arrangement of FIG. 3 a part of FIG. 2 is omitted, which relates to the coupling with target modules MEM1, MEM2 through network N. This highlights the merely exemplary function of the previous reference to memory modules and to a coupling achieved through an ICN network.

The arrangement to which the one or more embodiments refer is therefore, generally speaking, a processing system including at least one module 10 (in the present case exemplified by an IP node or core such as, for example, a CPU) which accesses, via a mechanism based on access transactions, a plurality of target modules (for example memories MEM1, MEM2).

In various embodiments, the access mechanism may be based on the fact that respective transaction identifiers are assigned to such transactions.

Various embodiments may involve, for example on the level of the transaction-reordering unit denoted by 20, a consistency check on the identifiers which are assigned to access transactions to a given module or target (as input identifiers ID).

In various embodiments, such a check may be based on the basic criterion of implementing a transaction-reordering system which is compatible with the consistency approach which may be required (for example by a protocol such as AXI) on a target-module level (for example memories MEM1 and MEM2).

In various embodiments, such a check operation may operate on the basis of a mechanism which may be expressed according to a functional relation $f$ such as:

$$CID=f(ID,TRG)$$

wherein:
ID is the "input" identifier, assigned to a given transaction,
TRG identifies the target module which is intended to be accessed with the same transaction,
CID is a consistent output identifier assigned to the ID/TRG pair according to criteria better detailed in the following.

It will be appreciated that the presently described approach may be applied to any number of target modules (TRG) irrespective of the nature of the single module.

In various embodiments, identifier CID may be a consistent identifier, in that it meets a consistency criterion such that access transactions are not reshuffled and, therefore, preserve their order and come back in the same order as they were output.

In accordance with general criteria applied in defining the architecture of processing systems, in various embodiments a consistent identifier may be an identifier which preserves the order of said transactions. Protocols such as AMBA AXI may actually prescribe (for example, through the so-called "ordering model" of AMBA AXI protocol) that the transactions with the same identifier not be reshuffled by target modules. This rule can provide data consistency, in other words so that the data item written at a given memory address is the item which corresponds to the latest write performed on that very address.

Various embodiments, therefore, ensure that, in all cases wherein consistency is required (or wherein transactions with the same ID are present which are destined to the same target module), the transactions keep on complying with the protocol rule which ensures consistency, therefore allowing the transactions to be received by the target with the same ID, although it may be different from the starting one.

As used herein, the term "consistent" is, therefore, connected to the definition of data consistency in memory, and implies that the transactions have IDs that ensure consistency in memory. In various embodiments, a given target module TRG may, therefore, form an identifier (ID)/given target module (TRG) pair, to which a consistent output identifier (CID) is assigned which allows the preservation of the order of the transactions.

For example, in various embodiments, identifier CID may be able to comply with an order constraint as imposed, for example, by a protocol such as AMBA, or may be able to ensure memory consistency as required by processing cores such as ARM cores.

Various embodiments may be based on the basic criterion according to which, if the same "input" identifier ID has already been issued, specifically for the same target module TRG (with the associated transaction(s) still outstanding), then as a consistent "output" identifier CID the same "input" identifier ID is used.

Various embodiments may, therefore, ensure that transactions originally having the same identifier ID are addressed to the same target module, preserving the same identifier ID even after consistency check, so as to comply with consistency rules governing the access to target modules (as prescribed, for example, by a protocol such as AXI).

Figure 4:
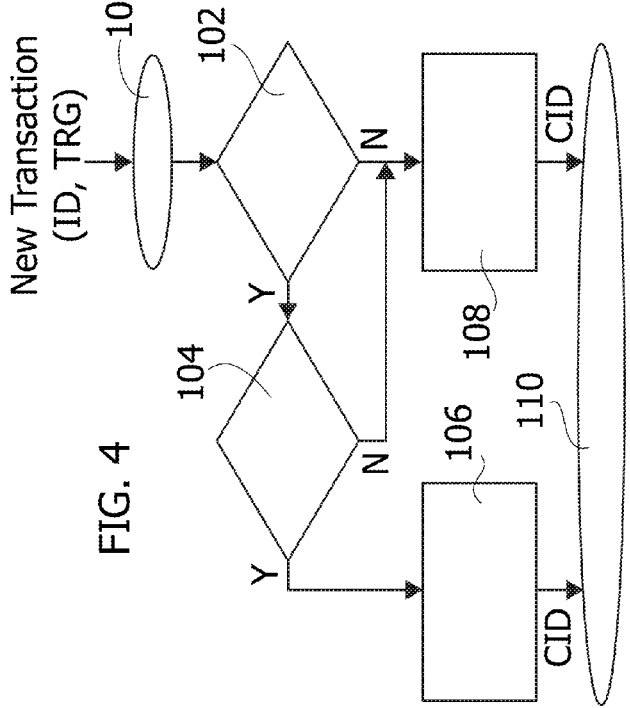
FIG. 4 is a flow chart representing possible operation criteria, according to one or more embodiments.

In various embodiments, said transaction (re)ordering process may be implemented on unit 20, according to the arrangement exemplified by the flow chart in FIG. 4.

In this chart it is assumed that step 100 is a starting step, corresponding to the generation of a new transaction destined to a given target module (TRG, according the aforementioned relation) to which initially an identifier ID was assigned as an "input" identifier. In various embodiments, the assignment criteria of such an input identifier may correspond to known criteria. In various embodiments, for the assignment of input identifiers ID it is possible to employ criteria better detailed in the following.

Starting from initial step 100, at a step 102 unit 20 checks whether the input identifier ID has already been issued before.

If the check of step 102 yields a positive result (Y=YES), at a step 104 it is checked whether that identifier ID, which has been checked as already issued, was issued for the same target module (TRG) for the new transaction. If the check of step 104 gives a positive result as well (Y=YES), at a step 106 unit 20 re-uses identifier ID received in input as identifier CID, assigned as a "consistent" output identifier to the ID/TRG pair.

If on the contrary either one of steps 102 and 104 yields a negative result (N=NO), which shows that input identifier ID has not been issued previously (negative result of step 102), or that input identifier ID, although previously issued, was issued for a target module TRG different from the one concerned by the input transaction (negative result of step 104), at a step 108 to the pair ID/TRG a "consistent" identifier CID is assigned (for example according to the criteria better detailed in the following) which is different from ID.

The procedure of assigning a "consistent" identifier CID can, therefore, be considered completed at a step 110, which may be followed, in various embodiments, by further operations, as better exemplified in the following.

Various embodiments may, therefore, ensure that, given an input pair of identifier ID/target module TRG, this pair is coupled with a consistent identifier CID, which is found according the following criteria:
if the input identifier ID has already been issued for the same target module TRG, input identifier ID is kept as a consistent output identifier CID,
if the input identifier ID has not been issued yet, or it has been issued but to a different target module TRG, to the input identifier (ID)/target module TRG pair a (new) consistent output identifier CID is assigned which is different from input identifier ID.

Figure 5:
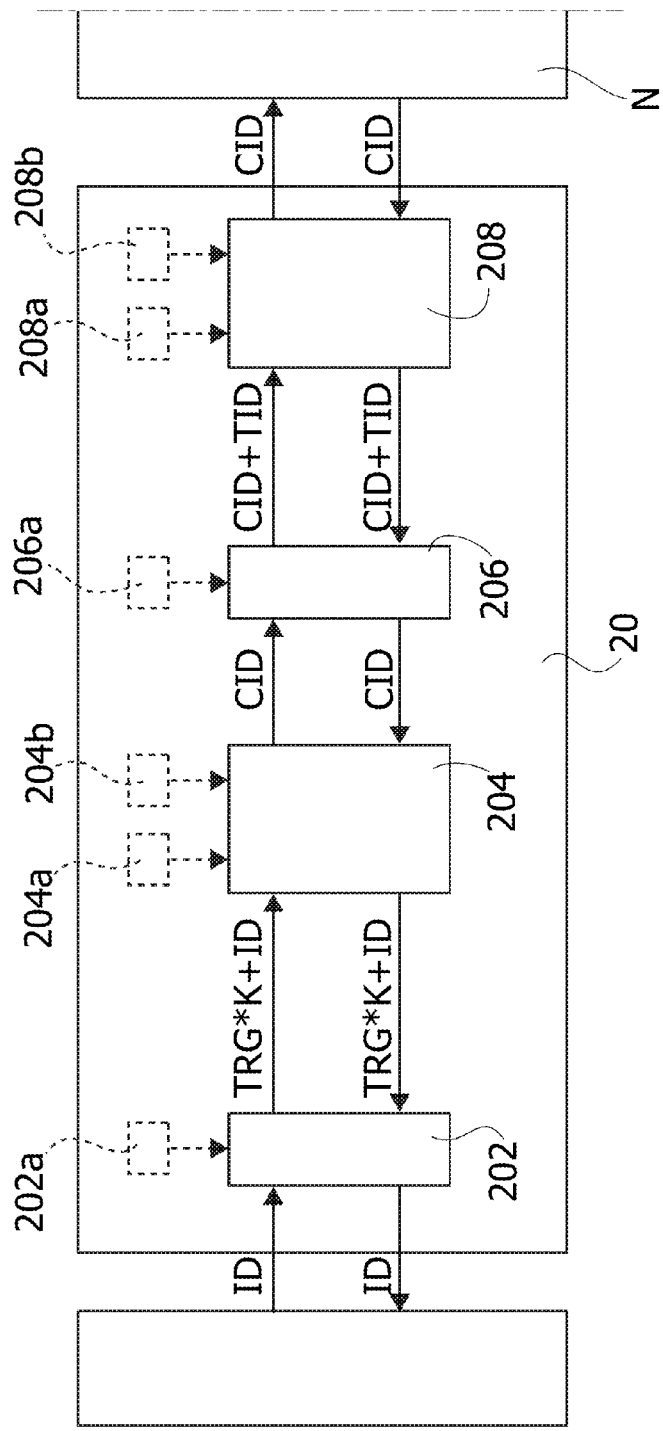
FIG. 5 is a detailed block diagram, according to one or more embodiments, FIG. 6 symbolically shows a compressing effect adapted to be implemented, according to one or more embodiments.

As exemplified in FIG. 5, in various embodiments unit 20 may include, cascaded from an input side (towards module 10) to an output side (towards network N), four modules or blocks:
a splitter module 202, having the function of generating identifiers ID included in distinct ranges for each target module;
a compression module 204, having the function of performing the check exemplified with reference to the flow diagram of FIG. 4, and of attributing to the ID/TRG pairs the "consistent" identifiers CID: this module is called a "compression" module because, if the criterion of various embodiments is employed, the total number of identifiers is always equal to or lower than the number of outstanding transactions,
a reordering module 206, having the function of reordering consistent identifiers CID by assigning tags TID thereto according to criteria to be better detailed in the following, also with the purpose of reordering responses, and
a tracker module 208, having the function of handling access transactions according to the reordering hierarchy, which is linked to identifiers CID.

In various embodiments, splitter module 202 may operate by generating identifiers ID by adding to the identifiers brought to the input an offset as a function of the target module TRG which is to be accessed.

In various embodiments, this offset may be defined by a relation such as:

$$\text{offset} = \text{TRG} * k$$

wherein k is a constant value, which may be chosen equal to the (maximum) number of identifiers that are to be assigned for each target module in the system, and TRG is a value (0, 1, ..., Nb−1) which identifies the target module currently considered, wherein Nb identifies the number of target modules existing in the system.

By operating according to such criteria, module 202 allows unit 20 to enable consistent identifiers CID, assigned according to the criteria previously outlined with reference to flow diagram in FIG. 4, to identify the input identifier/target module pair.

In various embodiments, splitter module 202 may identify which target module is referred to by each managed transaction on the basis of the addresses respectively received, for example, from modules MMU and AR, as schematically represented at 202a in FIG. 5. In various embodiments, it is possible to statistically configure or to program in registers memory regions related to the various target modules.

In various embodiments, as schematically represented in the diagram of FIG. 5, each module 202, 204, 206, 208 may be implemented so as to perform:

a given "forward" function, as described herein, in the "forward" direction from module 10 to target modules MEM1, MEM2, etc., and a complementary "backward" function, in the opposite direction (i.e., in the direction of the "responses" coming from target modules MEM1, MEM2, etc., and going to module 10): the features of such a complementary function, if not explicitly stated herein, derive directly from the description of the "forward" function presently provided.

For example, in a response step, module 202 may eliminate offset TRG*k which was added in the "forward" operation, so as to restore the original value of identifier ID to send back to module 10.

In various embodiments, compressor module 204 may correspond to the implantation previously described in Patent Publication WO 2011/095963 A1, which is incorporated by reference, on the basis of a remapping operation of identifiers.

In various embodiments, such an implementation may be based on the use of a table (for example a Look Up Table or LUT) the entries whereof include the identifier ID/target module TRG pairs which correspond to outstanding transactions, to which a count value may be associated which indicates how many outstanding transactions correspond to each pair.

The maximum number of pairs can be assumed as being equal to a value which can be defined as MOT, while the maximum number of outstanding transactions for each pair may be identified by value MOTC, such values being defined, in various embodiments, from outside the module, as schematically represented at 204a (MOT) and 204b (MOTC).

To each entry in the table it can be possible to associate, according to previously described criteria, a corresponding consistent identifier CID, and each entry can be filled with an arbitrary identifier ID/target module TRG pair.

In various embodiments, when such a table is full, the traffic (i.e., the generation and handling of new transactions) may be interrupted, while awaiting the return of responses for outstanding transactions.

According to the previously outlined criteria, particularly with reference to the flow chart of FIG. 4, in various embodiments, if an identifier ID received as input from module 204 is already in the table (for the same target module; this condition can be recognized for example thanks to the presence of the offset added by splitter module 202), it is possible to reuse it as a consistent identifier CID by incrementing by one unit the value of the corresponding count.

In various embodiments, reference to an identifier ID received as input to module 204 may actually apply to value (TRG*k+ID), i.e., to the value generated by module 202 from both starting items of information, ID and target, which are accessed.

In various embodiments, this situation can comply with a specific rule: if, upon arrival of a new transaction, outstanding transactions are already present having the same (TRG*k+ID) (or else the same ID/TRG pair), the corresponding CID is reused to ensure consistency.

In various embodiments, the count may therefore refer to the number of outstanding transactions for (TRG*k+ID), and therefore for ID/TRG pair or, ultimately, for CID.

In various embodiments, a new consistent identifier CID may be generated by filling the corresponding entry in the table with an input identifier ID/target module TRG pair chosen in an arbitrary way, by resetting to one the related count.

In various embodiments, an option for the choice of the new CID to assign may be to fill the first empty line in the table (i.e., the first line with count 0), and to use the index of the line as the value of CID.

In various embodiments, each time a consistent identifier CID "returns" starting from target modules, which indicates that the related access transaction is terminated, i.e., it is no longer outstanding, the related count can be decremented by one unit. In various embodiments, if the counter takes on zero value, this may mean that there are no more outstanding transactions for a given CID, which means that the related consistent identifier CID can be used for another identifier ID/target module TRG pair being input.

Figure 6:
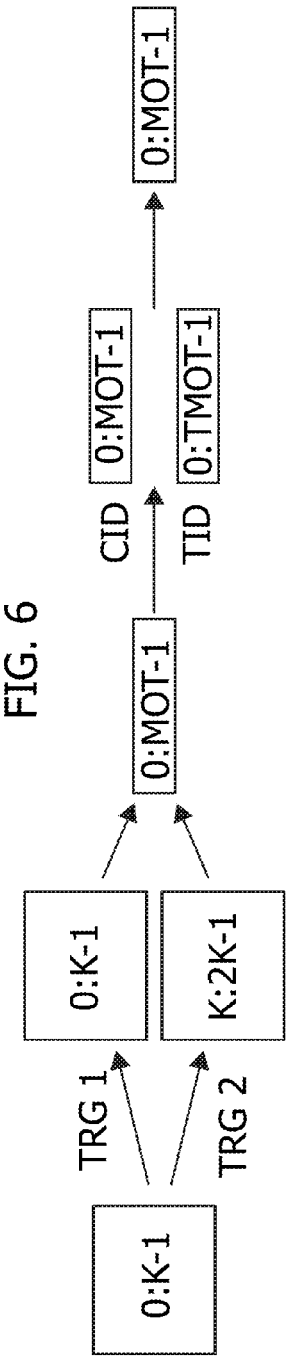

The diagram of FIG. 6 highlights the effect of "compression" achieved by module 204 (also as a function of the action of splitter module 202), in such a way that the value of the maximum value MOT of pairs is lower than the number of ID identifiers.

Specifically, the diagram of FIG. 6 shows that, starting from identifiers within the range 0:K−1 and by way of example assuming the presence of two target modules TRG 1 and TRG 2, the function of splitter module 202 leads to the definition, for the first target module TRG=1, of values of identifiers ID ranging between 0 and K−1, and for the second target module TRG=2 of values of identifiers ID ranging between K and 2K−1. The (re)use mechanism of identifiers ID already assigned for the same target module TRG is such that consistent identifiers CID can take on a number of distinct values comprised between 0 and MOT−1.

As previously said, in the opposite direction (i.e., in the response direction), module 204 may perform a complementary function, i.e., to restore, for each "return" identifier CID, the corresponding identifier ID (including offset K*TRG, which is to be removed from module 202).

In various embodiments, for module 206 as well it is possible to resort to a hardware arrangement as proposed, for example, in European Patent EP 2 444 903 A1, which is incorporated by reference (mentioned in the foregoing, wherein an implementation is described which can be used for a general reordering action of transaction identifiers).

In various embodiments, module 206 may operate by adding, to each consistent identifier ID received as input, a reordering tag TID, taken for example from a block 206a containing tags in a maximum number corresponding to TMOT (a number which in practice corresponds to the maximum number of transactions which may be outstanding in the considered system).

In various embodiments, for each consistent identifier CID received as input, module 206 can output a CID+TID pair including a consistent identifier CID, associated with a corresponding tag TID.

In this case as well, as previously stated, in the reverse direction (i.e., in the response direction), a module 206 can perform a complementary function, by removing tags TID from the pair.

In various embodiments, these tags TID may be used in order to perform a reordering function according to an arrangement which is compatible with the operation of target modules, determined by the protocols employed (for example AXI). It will be appreciated that the maximum number TMOT of outstanding transactions which can be handled is higher than, or at least equal to, the value MOT which identifies the maximum number of pairs in the table of compressor module 204.

In various embodiments, this reordering function may be performed by module 208, to which also values MOT and MOTC are available as inputs, as schematically represented at 208a and 208b.

Figure 7:
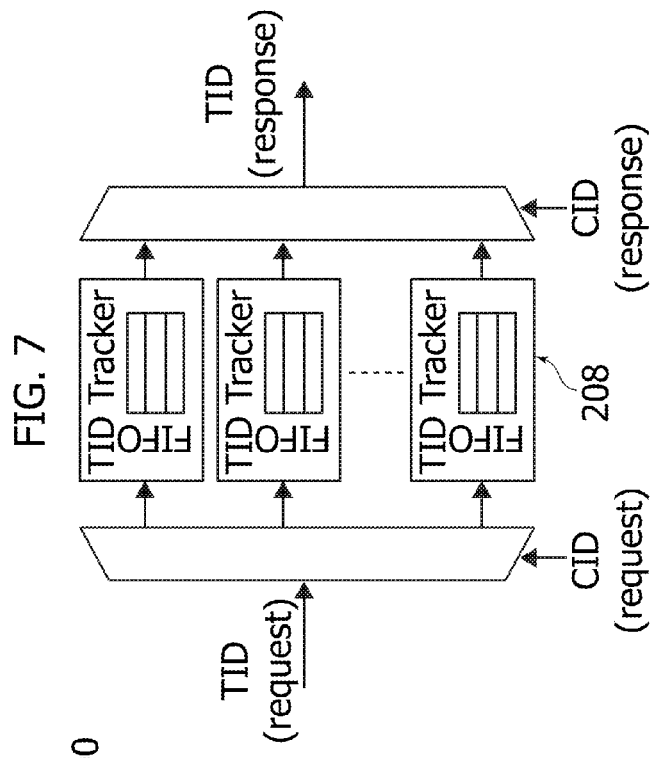
FIG. 7 is a further detailed block diagram, according to one or more embodiments.

In various embodiments, module 208 may operate according to the functional diagram exemplified in FIG. 7.

For example, in various embodiments, module 208 may collect in corresponding queues, for example FIFO (First In First Out) queues:

on one hand, the requests including consistent identifiers CID, and on the other hand, the corresponding requests of tag TID assignation.

After that, a "backward" return takes place both for responses in the form of tags TID and for responses in the form of identifiers CID.

In various embodiments, module 208 may operate so that, for a given consistent identifier CID, tags TID are collected into a FIFO queue. This process is possible due to the fact that identifiers CID intrinsically possess an order.

In various embodiments, this may correspond to the same rule of AMBA AXI protocol that provides consistency (AMBA AXI "ordering model"). In various embodiments, the order for CIDs can, therefore, be provided by the protocol itself and, thanks to this embodiment, it is possible to use the diagram of FIG. 7 with the goal of preserving locally the necessary reordering tags in response to module 206, in order to perform the actual reordering function.

The depth of FIFO queues adapted to be implemented via module 208 corresponds to the maximum number of transactions for each identifier CID (i.e., to the value MOTC) and the number of queues, for example FIFO, can correspond to value MOT.

Thanks to the possibility of having several transactions with the same consistent identifier CID, the number of outstanding transactions supported by the system can be higher than value MOT (corresponding in practice to the guaranteed value).

Various embodiments provide therefore a function which can be used for remapping identifiers ID into a specific form, so as to permit a consistent reordering with the operating structure of the target modules as defined, for example on protocol level (e.g., AMBA). In various embodiments, the related functions may be implemented at a hardware level, in case by using hardware components which are already known and described in prior documents.

Various embodiments permit ensuring the operation consistency of target modules (e.g., in the case of memories such as DDR memories), for example for systems on chip (SoCs) having embedded processing cores ARM, ensuring a high-performance level.

Various embodiments make use of advanced memory management techniques, for example in multi-DDR memory systems, without affecting performance or imposing high constraints on the system.

In various embodiments, the bit compression of identifiers ID may avoid a saturation of the related map of identifiers.

Various embodiments allow the achievement of one or several of the following advantages:
no more constraints on software level,
higher abstraction, with higher flexibility on the operating system level and for the use of driving units;
applicability to any system embedding ARM cores,
possibility to use a corresponding approach in different interconnect technologies, for example ARM, Arteris, Sonics, etc.

Of course, without prejudice to the underlying principles of the disclosure, the details and the embodiments may vary, even appreciably, with respect to what has been described by way of non-limiting example only, without departing from the scope of the disclosure.

For example, any of the above described-functions may be performed in hardware, software, firmware, or a combination of subcombination thereof, and any of the above-described modules may be implemented in hardware, software, firmware, or a combination of subcombination thereof.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus comprising:
a processor configured to generate a plurality of transactions;
a plurality of target circuits each having an address; and
a logic circuit coupled between said processor and said plurality of target circuits;
said logic circuit comprising
an identifying circuit configured to generate an identifier for each transaction based upon at least one address associated with each transaction, wherein not all transactions have the same address and identifier, and
a queuing circuit configured to
store the plurality of transactions in response to the identifier and in a look-up table, and
reorder the stored plurality of transactions in the look-up table based upon transactions having a same identifier and a same address and with a respective occurrence count in the look-up table, the respective occurrence count representing a number of times the same identifier and the same address have occurred in prior transactions.

2. The apparatus of claim 1 wherein the at least one address is associated with a physical space in which at least a portion of each transaction is to be conducted.

3. The apparatus of claim 1 wherein the at least one address is associated with a virtual space in which at least a portion of the transaction is to be conducted.

4. The apparatus of claim 1 wherein the identifier includes a position comprising a time at which each transaction is to be conducted relative to at least one other transaction associated with the at least one address.

5. The apparatus of claim 1 wherein the queuing circuit is configured to store the transaction for conduction.

6. The apparatus of claim 1 wherein the queuing circuit includes a buffer that corresponds to the at least one address represented by the identifier; and wherein said queuing circuit is configured to store the transaction in a location of the buffer, the location corresponding to a position represented by the identifier.

7. The apparatus of claim 1 wherein the queuing circuit includes a first-in-first-out buffer that corresponds to the at least one address represented by the identifier; and wherein said queuing circuit is configured to load each transaction into the first-in-first-out buffer at a relative time associated with a position represented by the identifier.

8. A circuit to be coupled between a processor generating a plurality of transactions, and a plurality of target circuits each having an address, the circuit comprising:
an identifying circuit configured to generate an identifier for each transaction based upon at least one address associated with each transaction, wherein not all transactions have the same address and identifier; and
a queuing circuit configured to
store the plurality of transactions in response to the identifier and in a look-up table, and
reorder the stored plurality of transactions in the look-up table based upon transactions having a same identifier and a same address and with a respective occurrence count in the look-up table, the respective occurrence count representing a number of times the same identifier and the same address have occurred in prior transactions.

9. The circuit of claim 8 wherein the at least one address is associated with a physical space in which at least a portion of each transaction is to be conducted.

10. The circuit of claim 8 wherein the at least one address is associated with a virtual space in which at least a portion of the transaction is to be conducted.

11. The circuit of claim 8 wherein the identifier includes a position comprising a time at which each transaction is to be conducted relative to at least one other transaction associated with the at least one address.

12. The circuit of claim 8 wherein the queuing circuit is configured to store the transaction for conduction.

13. The circuit of claim 8 wherein the queuing circuit includes a buffer that corresponds to the at least one address represented by the identifier; and wherein said queuing circuit is configured to store the transaction in a location of the buffer, the location corresponding to a position represented by the identifier.

14. The circuit of claim 8 wherein the queuing circuit includes a first-in-first-out buffer that corresponds to the at least one address represented by the identifier; and wherein said queuing circuit is configured to load each transaction into the first-in-first-out buffer at a relative time associated with a position represented by the identifier.

15. A network-on-chip (NOC) comprising:
a processor configured to generate a plurality of transactions;
a plurality of target circuits each having an address; and
a logic circuit coupled between said processor and said plurality of target circuits; said logic circuit comprising
an identifying circuit configured to generate an identifier for each transaction based upon at least one address associated with each transaction,
wherein not all transactions have the same address and identifier, and
a queuing circuit configured to
store the plurality of transactions in response to the identifier and in a look-up table, and
reorder the stored plurality of transactions in the look-up table based upon transactions having a same identifier and a same address and with a respective occurrence count in the look-up table, the respective occurrence count representing a number of times the same identifier and the same address have occurred in prior transactions.

16. The NOC of claim 15 wherein the at least one address is associated with a physical space in which at least a portion of each transaction is to be conducted.

17. The NOC of claim 15 wherein the at least one address is associated with a virtual space in which at least a portion of the transaction is to be conducted.

18. The NOC of claim 15 wherein the identifier includes a position comprising a time at which each transaction is to be conducted relative to at least one other transaction associated with the at least one address.

19. The NOC of claim 15 wherein the queuing circuit is configured to store the transaction for conduction.

20. The NOC of claim 15 wherein the queuing circuit includes a buffer that corresponds to the at least one address represented by the identifier; and wherein said queuing circuit is configured to store the transaction in a location of the buffer, the location corresponding to a position represented by the identifier.

21. The NOC of claim 15 wherein the queuing circuit includes a first-in-first-out buffer that corresponds to the at least one address represented by the identifier; and wherein said queuing circuit is configured to load each transaction into the first-in-first-out buffer at a relative time associated with a position represented by the identifier.

22. A method of operating communications between a processor generating a plurality of transactions, and a plurality of target circuits each having an address, the method comprising:
operating an identifying circuit to generate an identifier for each transaction based upon at least one address associated with each transaction, wherein not all transactions have the same address and identifier; and
operating a queuing circuit to
store the plurality of transactions in response to the identifier and in a look-up table, and
reorder the stored plurality of transactions in the look-up table based upon transactions having a same identifier and a same address and with a respective occurrence count in the look-up table, the respective occurrence count representing a number of times the same identifier and the same address have occurred in prior transactions.

23. The method of claim 22 wherein the at least one address is associated with a physical space in which at least a portion of each transaction is to be conducted.

24. The method of claim 22 wherein the at least one address is associated with a virtual space in which at least a portion of the transaction is to be conducted.

25. The method of claim 22 wherein the identifier includes a position comprising a time at which each transaction is to be conducted relative to at least one other transaction associated with the at least one address.

26. The method of claim 22 further comprising operating the queuing circuit to store the transaction for conduction.

* * * * *